(No Model.)
G. M. GITHENS.
PAWL AND RATCHET.
No. 416,331. Patented Dec. 3, 1889.
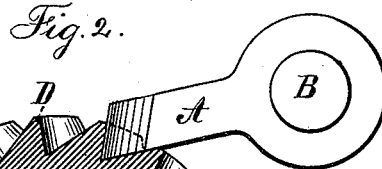
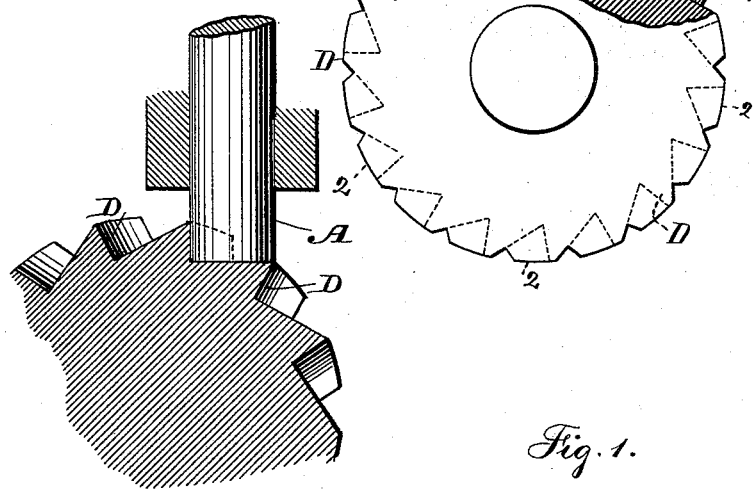
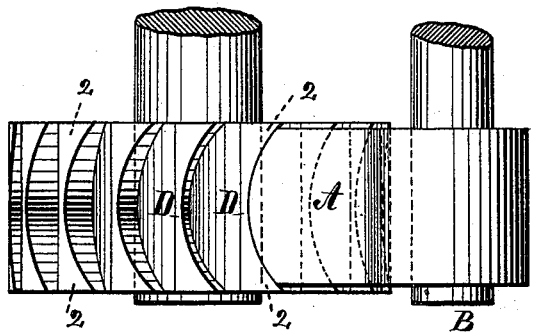
Witnesses:
J. Stail
Chas. H. Smith
Inventor:
George M. Githens
per Lemuel W. Serrell
Atty.

UNITED STATES PATENT OFFICE.

GEORGE M. GITHENS, OF BROOKLYN, NEW YORK.

PAWL AND RATCHET.

SPECIFICATION forming part of Letters Patent No. 416,331, dated December 3, 1889.

Application filed June 3, 1887. Renewed August 13, 1889. Serial No. 320,561. (No model.)

*To all whom it may concern:*

Be it known that I, GEORGE M. GITHENS, of the city of Brooklyn and State of New York, have invented an Improvement in Ratchets and Pawls, of which the following is a specification.

Ratchet wheels and racks have been made with teeth that are usually straight across their faces, and the pawl end has been square; but in consequence of continuous and often rapid use the joint or pivot of the pawl wears loose, and any slight inclination at the end of the pawl or on the teeth causes the pawl to slip laterally and not to take a full bearing against the end of the tooth, My improvement is made for removing the aforesaid difficulty and causing the pawl to hold the teeth firmly and without the possibility of the end slipping laterally, and at the same time the lateral strain on the pivot of the pawl is removed, and the ratchet-teeth can be cut or turned with greater rapidity than heretofore.

In the drawings, Figure 1 is a plan view of a ratchet-wheel and pawl. Fig. 2 is an elevation of the same, partially in section; and Fig. 3 is a partial section of a modification, showing the pawl as sliding.

The pawl A is of any desired size, and it is jointed or pivoted at B to any suitable support, or it may be fitted to slide in a stock or guides, as shown in Fig. 3, and the end or surface of the pawl against which the teeth act, instead of being square, as heretofore usual, is made as an arc of a circle.

The teeth D for the pawl, either on a wheel or on a rack, instead of being straight on the faces, are recessed as segments of a cylinder corresponding in radius to the arc at the end of the pawl. These teeth can be cut with great rapidity by a revolving burr or other tool, and the end of the tool is preferably flat, so that the pawl will have a flat surface for its under edge to rest upon. The tool may be made to cut into the metal to a greater or less depth. In the drawings a portion of the cylindrical surface of the wheel is shown as remaining at 2 2.

The end of the pawl passing into the curved recess of the tooth cannot move laterally, and the pawl is always held to its proper place, even if the pivot or joint is loose. When the pawl is in a support and slides endwise, the same should be cylindrical, as in Fig. 3, so that it may be revolved for lessening wear against the side near the end.

I do not claim a cylindrical pawl having a beveled end and passing into radial holes in a wheel.

I claim as my invention—

The combination, with a ratchet having teeth with segmentally-concave faces and inclined tops, that extend to the bottoms of the adjoining teeth, of a pawl the end of which is curved to correspond to the concave faces of the teeth, substantially as set forth.

Signed by me this 31st day of May, 1887.

GEO. M. GITHENS.

Witnesses:
GEO. T. PINCKNEY,
WILLIAM G. MOTT.